US012467281B2

(12) United States Patent
Petty et al.

(10) Patent No.: US 12,467,281 B2
(45) Date of Patent: Nov. 11, 2025

(54) MAGNETIC SENSOR FOR LOCK POSITION

(71) Applicant: ASSA ABLOY Residential Group, Inc., New Haven, CT (US)

(72) Inventors: Shannon Petty, San Francisco, CA (US); Aaron Treger, Pinole, CA (US)

(73) Assignee: ASSA ABLOY RESIDENTIAL GROUP, INC., New Haven, CT (US)

( * ) Notice: Subject to any disclaimer, the term of this patent is extended or adjusted under 35 U.S.C. 154(b) by 54 days.

(21) Appl. No.: 18/613,915

(22) Filed: Mar. 22, 2024

(65) Prior Publication Data

US 2024/0240497 A1 Jul. 18, 2024

Related U.S. Application Data

(63) Continuation of application No. 17/475,029, filed on Sep. 14, 2021, now Pat. No. 11,959,308.

(60) Provisional application No. 63/079,864, filed on Sep. 17, 2020.

(51) Int. Cl.
*E05B 47/00* (2006.01)
*G01D 5/14* (2006.01)

(52) U.S. Cl.
CPC ......... *E05B 47/0012* (2013.01); *G01D 5/145* (2013.01); *E05B 2047/0017* (2013.01); *E05B 2047/002* (2013.01); *E05B 2047/0069* (2013.01)

(58) Field of Classification Search
CPC ................. E05B 47/00; E05B 47/0012; E05B 2047/0014–0018; E05B 2047/002; E05B 2047/0022; E05B 2047/0067; E05B 2047/0069; G01D 5/145
USPC ........................................................... 70/277
See application file for complete search history.

(56) References Cited

U.S. PATENT DOCUMENTS

| | | | | |
|---|---|---|---|---|
| 9,719,278 | B2 * | 8/2017 | Taylor | E05B 63/0065 |
| 9,885,588 | B2 * | 2/2018 | Misfatto | E05B 39/00 |
| 10,006,929 | B2 * | 6/2018 | Ten Kate | G08B 13/08 |
| 10,697,203 | B1 * | 6/2020 | Gokcebay | E05B 17/10 |
| 11,043,055 | B2 * | 6/2021 | Johnson | H04N 7/186 |
| 11,091,936 | B2 * | 8/2021 | Beck | E05B 17/22 |
| 11,319,727 | B1 * | 5/2022 | Tobias | E05B 45/06 |
| 11,840,866 | B2 * | 12/2023 | Miller | E05B 15/0205 |
| 11,881,066 | B2 * | 1/2024 | Ross | E05B 47/0038 |
| 11,959,308 | B2 * | 4/2024 | Petty | G01D 5/145 |
| 12,067,855 | B2 * | 8/2024 | Abueshsheikh | G08B 25/08 |
| 2010/0206020 | A1 * | 8/2010 | Chen | B62H 5/02 70/210 |
| 2012/0299314 | A1 * | 11/2012 | Jiang | E05B 45/083 292/137 |

(Continued)

*Primary Examiner* — Nathan Cumar
(74) *Attorney, Agent, or Firm* — Calfee, Halter & Griswold LLP

(57) ABSTRACT

According to some exemplary embodiments described herein, a door lock may include a driveshaft operatively couplable to a bolt configured to move between an extended position and a retracted position to selective secure an associated door. The door lock may also include a transmission coupled to the driveshaft, where the driveshaft includes at least one gear configured to rotate with the driveshaft. The door lock may also include a magnetic encoder coupled to the transmission and configured to measure a position of the at least one gear. The magnetic encoder may include a diametrically polarized magnet coupled to the at least one gear.

20 Claims, 8 Drawing Sheets

(56) References Cited

U.S. PATENT DOCUMENTS

| | | | | |
|---|---|---|---|---|
| 2013/0340491 | A1* | 12/2013 | Lambrou | E05B 47/0012 70/277 |
| 2014/0062466 | A1* | 3/2014 | Thibault | G01B 7/14 324/207.22 |
| 2016/0189511 | A1* | 6/2016 | Peterson | E05B 47/06 340/545.3 |
| 2016/0225240 | A1* | 8/2016 | Voddhi | H04W 4/38 |
| 2016/0290009 | A1* | 10/2016 | Feirer | G08B 13/08 |
| 2017/0002586 | A1* | 1/2017 | Lee | E05B 39/00 |
| 2017/0193724 | A1* | 7/2017 | Johnson | G07C 9/00309 |
| 2018/0040183 | A1* | 2/2018 | Cheng | G07C 9/00309 |
| 2019/0040653 | A1* | 2/2019 | Baumgarte | E05B 47/0673 |
| 2020/0011088 | A1* | 1/2020 | Harris | G07C 9/00309 |
| 2020/0105124 | A1* | 4/2020 | Nichols, Sr. | G08B 13/2491 |
| 2020/0181946 | A1* | 6/2020 | Laurans | E05B 47/0012 |
| 2020/0279446 | A1* | 9/2020 | Hage | E05B 39/005 |
| 2021/0383663 | A1* | 12/2021 | Shamai | G08B 13/08 |
| 2022/0058904 | A1* | 2/2022 | Ross | E05B 47/0038 |
| 2022/0081936 | A1* | 3/2022 | Petty | E05B 47/026 |
| 2022/0101672 | A1* | 3/2022 | Abueshsheikh | E05B 9/08 |
| 2022/0101706 | A1* | 3/2022 | Abueshsheikh | E05B 63/0017 |

* cited by examiner

MAGNETIC SENSOR FOR LOCK POSITION

CROSS-REFERENCE TO RELATED APPLICATIONS

This application is a continuation of U.S. application Ser. No. 17/475,029, titled “MAGNETIC SENSOR FOR LOCK POSITION”, filed on Sep. 14, 2021, which claims the benefit of U.S. Provisional Application Ser. No. 63/079,864, titled “MAGNETIC SENSOR FOR LOCK POSITION”, filed on Sep. 17, 2020, the contents of each of which is incorporated herein in its entirety.

FIELD

Some disclosed embodiments relate to a magnetic sensor that may be used to provide a value indicative of a position of a bolt of a door lock, which may aid in determining the current status of the lock and/or in operating a component (e.g., a motor) to change the status of the lock. In some embodiments, a magnet may change position and/or orientation as a bolt of a lock is moved and the position and/or orientation of the magnetic may be sensed by a magnetic sensor to determine the position of the bolt and the status of the lock. In some embodiments, a rotating driveshaft may rotate multiple times as a bolt is moved to a locked position, and a transmission may be arranged such that as the driveshaft rotates multiple times the magnet is rotated only once.

BACKGROUND

Deadbolt locks may be used to secure doors to prevent unauthorized entry. Some deadbolt locks can be operated manually by a knob, thumb-turn, or other handle mounted on a secured side of the door, and by a key on an unsecured side of the door. For such deadbolt locks, rotation of the handle extends or retracts a deadbolt into or out of the door. Some deadbolts may be electromechanically actuatable in addition to being manually actuatable. Such electromechanical deadbolts may include a motor that may extend or retract the bolt. Typically, rotation of a shaft is converted into linear motion of the bolt between extended and retracted positions.

SUMMARY

In some embodiments, there is provided a door lock including a driveshaft operatively couplable to a bolt, a transmission coupled to the driveshaft, where the transmission includes at least one gear configured to rotate with the driveshaft, and a magnetic encoder coupled to the transmission and configured to output at least one value indicative of a position of the at least one gear.

In some embodiments, there is provided a method of operating a door lock including rotating a driveshaft to move a bolt of the door lock between an extended position and a retracted position. Rotating the driveshaft includes rotating a transmission coupled to the driveshaft, where the transmission includes at least one gear coupled to the driveshaft, and rotating a magnetic encoder coupled to the at least one gear. The method also includes determining a position of the driveshaft, where determining the position of the driveshaft comprises determining a position of the at least one gear using the magnetic encoder.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1:
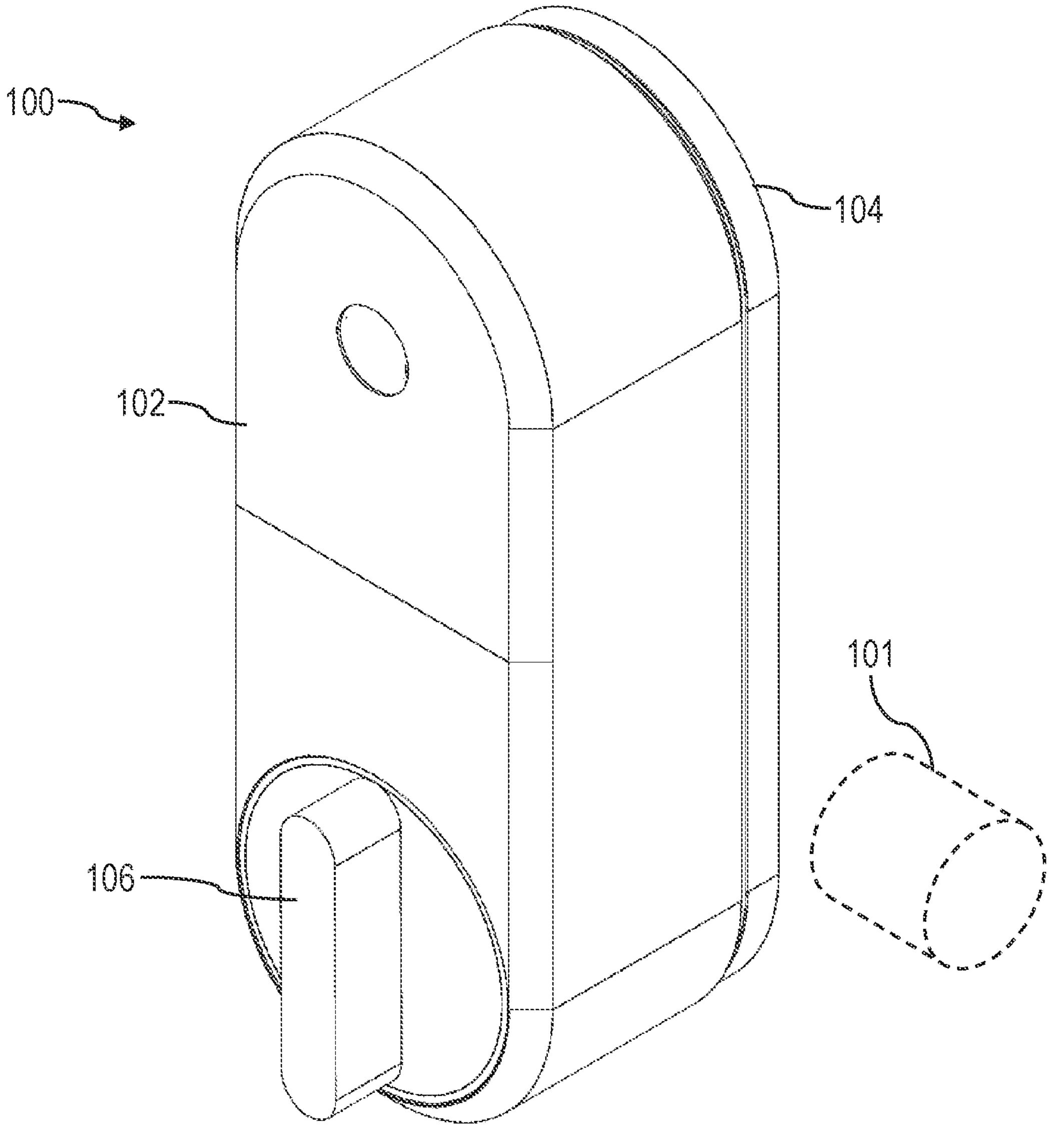
FIG. 1 is a front perspective view of one embodiment of a door lock.

Traditionally, doors often employ deadbolt locks (also referred to simply as deadbolts) including a bolt that in a retracted (e.g., unlocked) position is disposed at least partially within a door and in an extended (e.g., locked) position extends out from the door, such as into a door jamb of a door frame. The physical presence of the bolt extending from within the door into the door jamb inhibits the door from being opened by blocking the door from being swung out of the door frame.

The inventors have contemplated that it would be desirable to have a door lock that includes and adds electromechanical drive capabilities for an associated deadbolt, that is also retrofittable to existing lock sets so consumers who desire remote or automatic actuation capabilities could add such capabilities without extensive modification of their existing doors. One example of such a door lock may be described in U.S. Pat. No. 9,528,296. Such door locks can often be manually actuated to directly drive the bolt, while also including an actuator and clutch mechanism for non-manual actuation of the bolt. Such lock actuators are configured to move the bolt of the lock between the extended position and/or the retracted position.

Such door locks may employ one or more rotating shafts that rotate as part of driving the extension or retraction of the bolt of the door lock, when manually operated or when operated by the actuator. As the rotating shaft rotates, the bolt is driven along its linear path of travel between the retracted position and/or the extended position. Accordingly, a rotational position of a rotating driveshaft may correspond to a linear position, along the travel path, of the bolt of the door lock that is driven by the driveshaft.

In some cases, the linear position of the bolt may affect the security of a door. For example, a bolt that is fully extended (i.e., fully moved along the travel path, in the extended position) may be more secure than a bolt that is partially extended (i.e., not in the retracted position but not fully moved along the travel path). Additionally, in some cases the linear position of the bolt may be useful in controlling operation of an actuator rotating the shaft controlling the bolt. For example, applying force to the bolt when the bolt is at an end of travel in the extended position or retracted position may stress or damage the actuator.

In view of the above, the inventors have recognized the benefits of a door lock that allows a position of a driveshaft associated with the door to be determined when the driveshaft is moved both manually and automatically. As a bolt may be manually driven via a handle when the bolt is decoupled from the actuator, the bolt is not always going to be in a position set by the actuator. Moreover, the bolt is not constrained to only stopping at the positions to which the actuator is configured to drive the bolt and thus may not be only in a fully extended or fully retracted position, but rather could stop anywhere along a travel path as a result of a manual operation. With knowledge of the position of the driveshaft, a controller of the door lock may be configured to change one or more parameters associated with an automatic door locking or unlocking profile. For example, a door lock may calculate the amount of time required to operate the actuator at certain output speeds for the bolt to reach an extended or retracted position based on the existing rotational position of the driveshaft. Additionally, a door lock may prevent over-driving or under-driving the bolt with the actuator with position feedback control that may otherwise lead to damage of a locking mechanism.

The inventors have recognized, however, that monitoring a rotational position of a rotating driveshaft is not necessarily straightforward. Some approaches to monitoring position may have disadvantages. For example, in some approaches one signal could be generated each time a bolt moves some increment along a travel path in the extending direction and another signal could be generated each time the bolt moves some increment along the travel path in the retracting direction. Those incremental signals could be tracked over time to determine a position at a time, and that position could be stored in memory as lock position information. When a new incremental signal is received, the new incremental signal could be evaluated together with the stored lock position information to generate a new lock position information that is stored. At any time, the memory would store the position of the bolt along the travel path. The disadvantage of this incremental signal approach, though, is that it depends on the persistent storage of the lock position information. If the lock position information is erased from the memory, such as in a case that the memory is a volatile memory and there is a power interruption (e.g., drained battery), it becomes difficult to know the position of the bolt without a calibration or initialization procedure. It would be advantageous to know the position of the bolt at any time, without dependence on memory or power, and thus a non-incremental approach may be better in some scenarios.

For a non-incremental approach to be successful in this context, it would be advantageous if a sensor system included a physical property that does not vary (or does not vary greatly over time) and, thus, could be used as a form of constant in the detection process for the bolt along a travel path. Electrical resistance may be one such detectable property that could be used. The inventors have recognized that another non-incremental approach would leverage a magnet and associated sensor to detect the magnetic field of the magnet, as the magnetic field is another such physical property that does not vary (or vary greatly).

To monitor the position of the bolt, at least two options are available. One, a detection could be made of the bolt itself along the travel path. Second, additionally or alternatively, a detection could be made of a rotational position of a rotating driveshaft that drives the bolt along the travel path. With respect to the latter approach, however, the inventors recognized that determining the position of the bolt from the rotational position of a driveshaft is disadvantageous with some locks.

Some deadbolt locks include a multi-turn locking mechanism, where during a manual operation a handle is rotated greater than one full rotation to move a bolt between an extended position and a retracted position. For example, a handle may be rotated between 2 and 10 full rotations, between 4 and 6 full rotations, and/or 5 rotations to move a bolt between a retracted position and an extended position. In such a lock, a rotating driveshaft is rotated the same number of times to drive the bolt to the extended position from the retracted position. As the driveshaft undergoes multiple complete revolutions as the bolt moves along the travel path, it would be unclear just from the rotational position of the driveshaft what the position of the bolt is. This is at least because, though the rotational position may be detected, it may be unclear which rotation the driveshaft is currently experiencing from among the multiple rotations the driveshaft undergoes. To use this approach, then, some additional information would be useful, that could indicate which rotation is underway at a particular time. An incrementing signal indicating the number of rotations experienced so far would be helpful, but this would undermine the goal of achieving a non-incrementing approach to detecting bolt position.

Accordingly, the inventors recognized that there would be complications to implementing a non-incrementing approach to determining position of a bolt along a travel path using rotational position of a driveshaft.

Described herein are some embodiments of a door lock that includes a driveshaft that makes multiple full rotations between a locked state (e.g., where a bolt is in an extended position) and an unlocked state (e.g., where a bolt is a retracted position), and which is configured to determine a position of a bolt along a travel path using a magnetic sensor to determine a rotational position of a driveshaft. In some such embodiments, the door lock may include a magnetic encoder that includes a magnet and an associated magnetic sensor. The magnet may be arranged in the door lock such that, as the driveshaft rotates, the magnet also rotates. The magnetic sensor detects the magnetic field of the magnet and an orientation (e.g., rotational position) of the magnet is determined from the magnetic field. From the rotational position of the magnet, the position of the bolt is determined.

In some such embodiments, the door lock includes a transmission coupling the magnetic encoder to the driveshaft, where the transmission includes at least one gear. The transmission may reduce rotations of the driveshaft to rotations of the magnet of the magnetic encoder in an N:1 ratio, where N is greater than 1, such that when the driveshaft rotates N times, the magnet rotates only once. N may be less than equal to 10. (In some embodiments, N may be greater than or equal to 4 and less than or equal to six. In some embodiments, N may be approximately equal to 5.) In this way, though the rotating driveshaft rotates multiple times as the bolt travels the full travel path, the magnet of the magnetic encoder rotates only once. This gearing down of the driveshaft rotations to rotations of the encoder may allow the encoder to report an absolute position of driveshaft as opposed to an incremental position. The magnetic encoder may accordingly be a non-incremental encoder.

In some embodiments, the magnetic encoder may include a diametrically polarized magnet coupled to the at least one gear, where the magnetic encoder measures the rotational orientation of the polarized magnet to determine an absolute position of the at least one gear. The absolute position of the at least one gear may correspond to an absolute position of the driveshaft. In some embodiments, the magnetic encoder may retain an accuracy to within 25 degrees rotation of the driveshaft even while geared down. (In some embodiments, the magnetic encoder may retain an accuracy to within 10 degrees rotation of the driveshaft. In some embodiments, the magnetic encoder may retain an accuracy to within 7 degrees rotation of the driveshaft.)

In some cases, a door lock may be powered with a power source, which may be integrated or external. For example, in some cases a door lock may be powered by batteries. Accordingly, in some instances a door lock may experience power loss, where volatile memory onboard the door lock is erased (e.g., no longer stores data or no longer stores data in a reliably perceptible manner). In some embodiments where position information related to a driveshaft is stored in memory, such an erasure may include a loss of previously-stored position information relating to the position of a driveshaft of the door lock or at least one gear of a transmission of the door lock. According to exemplary embodiments described herein, the inventors have appreciated the unique benefits of a magnetic encoder for determining the position of a driveshaft of a door lock. The magnetic encoder may measure the rotational position of a magnet formed as a diametrically polarized magnet by measuring the magnetic field of the magnet. Accordingly, the magnetic encoder may be able to determine an absolute position of the magnet, even following a power cycling event and without prior position information.

The magnetic encoder may also have packaging benefits in some embodiments, in the form of a low profile where the magnet and a sensor of the magnetic encoder may be placed side-by-side such that overall height is reduced relative to other encoder configurations. Of course, other arrangements where the sensor and magnet are coaxial with one another are also contemplated. The magnetic encoder according to exemplary embodiments described herein may also provide a linear sensing pattern, especially compared with conventional rotary potentiometers.

In some embodiments, a door lock includes a driveshaft that is couplable to the bolt. In some embodiments, the door lock may be configured to retrofit onto an existing deadbolt lock that was in place on a door prior to introduction of a lock system including an actuator for the bolt. The driveshaft may be a portion of the pre-existing deadbolt lock and drives a bolt of the pre-existing deadbolt lock. In such a case, certain external elements of the pre-existing deadbolt lock may be removed to expose the driveshaft, and components of the door lock may be arranged to enable the actuator to drive the driveshaft. It should be appreciated, however, that embodiments are not limited to a retrofit context and that the driveshaft and bolt may not be components of a pre-existing deadbolt lock.

The door lock of some embodiments may also include a transmission coupled to the driveshaft. The transmission may include at least one gear configured to rotate with the driveshaft. The transmission may reduce the rotations of the driveshaft to rotations of other components in the door lock. For example, in some embodiments, the door lock may also include an actuator such as a motor, and the motor may be selectively connected to the driveshaft through the transmission. The door lock may also include a magnetic encoder coupled to the transmission and configured to measure a position of the at least one gear. The at least one gear may be constantly connected to the driveshaft, such that a magnet of the magnetic encoder rotates whenever the driveshaft rotates. In this manner, the magnetic encoder may be used by the door lock to determine a position of the driveshaft when the driveshaft is manually moved or moved automatically by the actuator. The transmission may reduce the number of rotations of the magnetic encoder relative to rotations of the driveshaft. For example, for every five rotations of the driveshaft the magnetic encoder may rotate once. Of course, other ratios are contemplated including ratios between 2:1 and 10:1, as well as ratios between 4:1 and 6:1. While integers are provided here as examples, embodiments are not limited to integer gear ratios. In one embodiment, the gear ratio of the transmission is 5.8:1.

According to some exemplary embodiments described herein, a magnetic encoder may include one or more diametrically polarized magnets coupled to at least one gear of a transmission of a door lock, and a sensor positioned adjacent the magnet. The sensor may be configured to measure the magnetic field of the polarized magnet(s) so that a rotational orientation of the magnet(s) may be determined. The sensor may generate a signal indicative of the position of the magnet(s) and thus of the at least one gear, and may transmit the signal to one or more processors of the door lock. The processor(s) may use the signal to determine a position of the driveshaft. In some embodiments, the processor(s) may convert the position of magnet and the at least one gear to a position of the driveshaft by a predetermined gear ratio between the at least one gear and the driveshaft. Following this conversion, the determined position of the driveshaft based on the signal from the magnetic encoder may be accurate to within 25 degrees rotation of the driveshaft. (In some embodiments, the magnetic encoder may be accurate to within 10 degrees rotation of the driveshaft. In some embodiments, the magnetic encoder may be accurate to within 7 degrees rotation of the driveshaft.) As discussed previously, the signal of the magnetic encoder may be non-incremental, such that the processor need not store a prior known position of the driveshaft. That is, the position of the driveshaft may be determined by the processor(s) based on the signal from the magnetic encoder without reference to a prior position of the driveshaft. Accordingly, volatile memory associated with the processor(s) may be erased following a power cycling event, and the position of the driveshaft may be determined once power is restored without needing to move the driveshaft. Accordingly, the position of the driveshaft may be known prior to or without any calibration or initialization process.

According to exemplary embodiments described herein, a door lock may include one or more processors configured to coordinate one or more functions of the door lock. The processor(s) may be configured to execute one or more sets of computer-executable instructions stored on computer-readable storage onboard the door lock. The storage may be implemented as one or more volatile and/or non-volatile storages, such as non-volatile memory. The processor(s) may be configured to receive information from one or more sensors of the door lock, including signals from a magnetic encoder of the door lock. The processor(s) may also be configured to command one or more actuators of the door lock. For example, the processor(s) may command an actuator (e.g., a motor) to automatically move a driveshaft of the door lock. The processor(s) may also be configured to communicate with one or more other devices. For example, the processor(s) may control one or more wireless transmitters of the door lock to send or receive information/commands to or from a remote device, respectively. The door lock may include a power source configured to supply electrical power to the processor(s) and associated components. In some embodiments, the power source may be one or more batteries.

According to some exemplary embodiments described herein, a rotational position of a driveshaft of a door lock may be determined based at least in part on a signal from a magnetic encoder indicative of a rotational position of at least one gear. Rotational position may include a rotational orientation as well as an index of the progress of a rotating component (e.g., the driveshaft, the at least one gear) of the door lock between a locked position associated with an extended position of a bolt and an unlocked position associated with a retracted position of the bolt. For example, a position of the driveshaft may include both the rotational orientation of the driveshaft (e.g., between 0 and 360 degrees) as well as the index of the current rotation between a locked position and an unlocked position. So, if the driveshaft rotates five times between the locked position and the unlocked position, the "position" may refer to a current rotational orientation as well as which rotation (1, 2, 3, 4, or 5) the driveshaft is currently on.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

FIG. 1 is a front perspective view of one embodiment of a door lock 100. According to the embodiment of FIG. 1, the door lock may be configured for retrofit applications, where the door lock 100 is coupled to a pre-existing deadbolt lock in a door. In particular, the door lock 100 is configured to interface with a pre-existing bolt 101 and move the bolt between an extended position and retracted position. As shown in FIG. 1, the door lock 100 includes a housing 102 enclosing several internal components as will be discussed in detail with reference to FIGS. 2-5. The housing encloses one or more processors, power source, transmission, driveshaft and a magnetic encoder. The magnetic encoder is configured to measure a position of a component of the transmission, so that the processor may determine an absolute position of the driveshaft. The process of determining a location of the driveshaft and related processes will be discussed further with reference to FIGS. 6 and 7-8. According to the embodiment of FIG. 1, the door lock also includes a mounting plate 104 configured to allow the housing 102 to be mounted to an associated door. The mounting plate may allow the housing to be mounted with one or more fasteners (e.g., screws) or toollessly (e.g., with one or more latches). In some embodiments, the mounting plate may mount to existing deadbolt lock hardware in a pre-existing door. Of course, any suitable arrangement may be employed for mounting the housing 102 to a door, as the present disclosure is not so limited.

According to the embodiment of FIG. 1, the door lock 100 includes a handle 106 that may be rotated by a user to correspondingly rotate a driveshaft of the door lock. The driveshaft is in turn couplable to the bolt 101 and configured to transfer rotational motion of the driveshaft into linear movement of the bolt. The handle 106 may be continuously coupled to the driveshaft, such that whenever the bolt 101 moves the handle 106 correspondingly moves. Accordingly, measurement of the position of the driveshaft of the door lock may also allow the door lock to determine a position of the bolt 101 as well as the handle 106. Of course, in some embodiments the handle 106 may be selectively couplable to a driveshaft of the door lock, as the present disclosure is not so limited.

Figure 2:
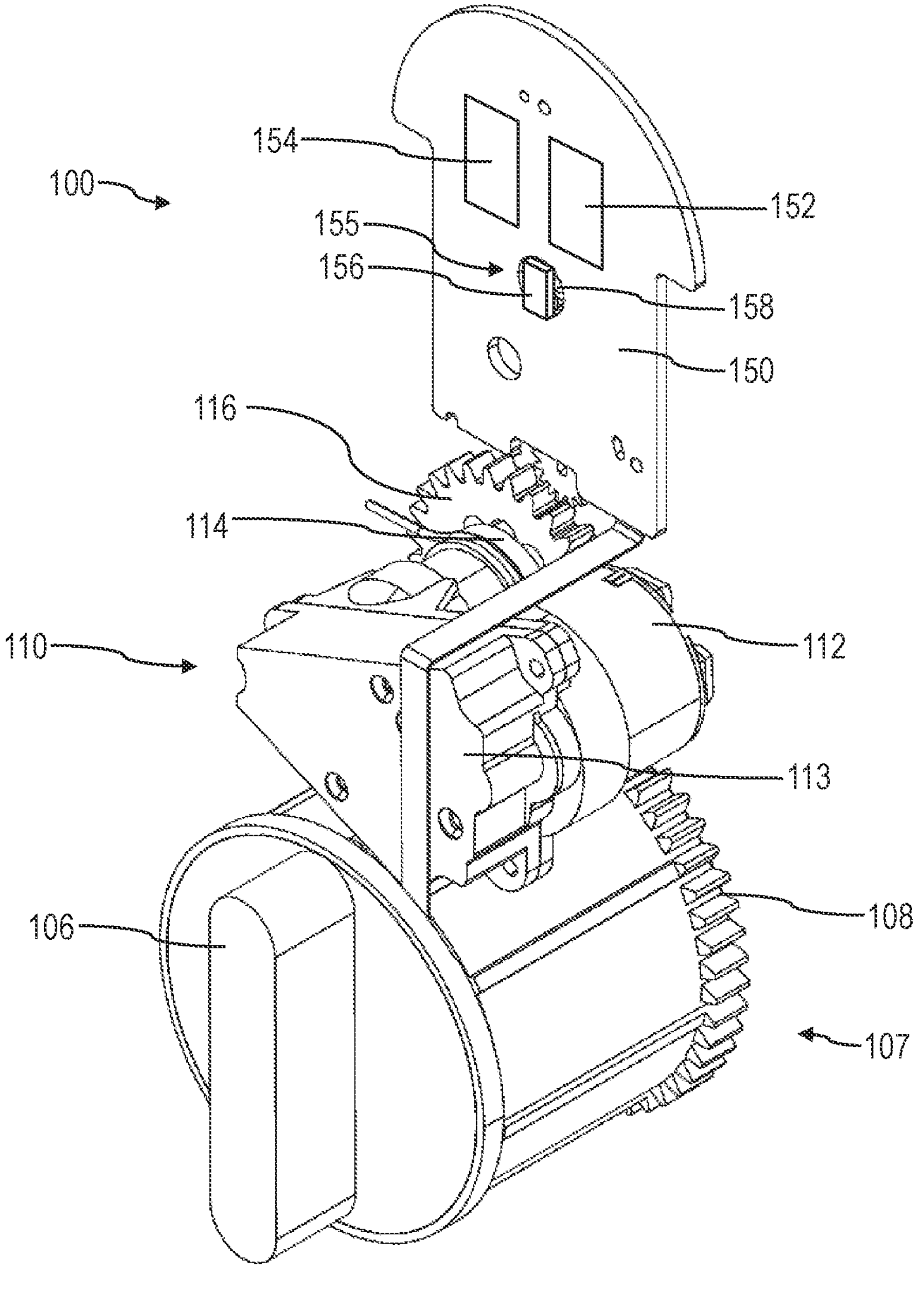
FIG. 2 is a front perspective view of the door lock of FIG. 1 with a housing of the door lock removed.

FIG. 2 is a front perspective view of the door lock 100 of FIG. 1 with the housing of the door lock removed so that the internal components of the door lock are visible. As shown in FIG. 2, the door lock includes an actuator assembly 110. The actuator assembly includes a motor 112, a motor coupler 113, and a clutch 114. The motor 112 is a DC motor configured to provide force to automated locking or unlocking of the door lock. The motor coupler 113 transfers force from an output shaft of the motor 112 to the clutch 114. The clutch is configured to selectively transfer the force from the motor 112 to an output gear 116. According to the embodiment of FIG. 2, the handle 106 is directly coupled to a driveshaft 107 of the door lock. The output gear 116 is continually coupled to a drive gear 108 formed on the driveshaft 107, such that the output gear 116 rotates whenever the driveshaft 107 is rotated. Accordingly, the motor 112 may be selectively couplable to the driveshaft 107 so that the motor may rotate the driveshaft to correspondingly move an associated bolt to an extended position or a retracted position. As will be discussed further with reference to FIGS. 3-4, such an arrangement allows a magnetic encoder coupled to the output gear 116 to measure the absolute position of the driveshaft 107.

In some embodiments as shown in FIG. 2, the door lock 100 includes a circuit board 150 which includes electrical components configured to control various functions of the door lock. According to the embodiment shown in FIG. 2, the circuit board includes a processor 152 and a wireless transceiver 154.

The processor 152 is configured to execute computer-executable instructions stored in one or more storages onboard the circuit board 150 to coordinate the performance of various tasks. For example, various methods that may be coordinated by the processor 152, as will be discussed further with reference to FIGS. 5-8.

The wireless transceiver 154 is configured to communicate with one or more remote devices via radio frequency (RF) transmissions. The wireless transceiver may employ any suitable RF standard, including, but not limited to ZigBee, Bluetooth, Bluetooth Low Energy, 802.15.4, and Wi-Fi. The processor 152 may transmit commands or information regarding the door lock (e.g., lock status) through the wireless transceiver 154. Additionally, the processor 152 may receive commands through the wireless transceiver (e.g., a remote lock command or remote unlock commands) and then execute computer-executable instructions based on the command received. While for simplicity one wireless transceiver 154 is discussed, embodiments are not so limited and, in some embodiments, two or more wireless transceiver(s) may be included that implemented any of the foregoing wireless protocols or other suitable wireless protocols.

The door lock 100 may also include a power source such as a battery which is configured to supply power to the various component on the circuit board 150, such as the processor 152, wireless transceiver 154, and magnetic encoder 155.

According to the embodiment of FIG. 2, the door lock 100 includes a magnetic encoder 155. The magnetic encoder is configured to measure a rotational position of at least one gear of a transmission, as will be discussed in detail with reference to FIGS. 3-4. As shown in FIG. 2, the magnetic encoder includes a sensor 156 and a magnet 158. The magnet 158 may be, in some embodiments, a diametrically polarized magnet. The sensor is configured to measure the magnetic field of the magnet 158, which can be used to determine the orientation or rotational position of the magnet 158. That is, the sensor 156 is able to measure the magnetic field of the diametrically polarized magnet at the sensor 156, which would be impacted by the arrangement of the poles of the magnet, and output one or more values indicative of the magnetic field. The values indicative of the magnetic field as measured by the sensor 156 would be indicative of the rotational position or orientation of the magnet 158. Since the orientation of the magnet 158 is indicative of the position of the gear 116, and the position of the gear 116 is indicative of the rotation of the driveshaft 107, and the rotation of the driveshaft 107 is indicative of the position of the bolt 101, the orientation of the magnet 158 can be used to determine the position of the bolt 101. The sensor 156 may output the value(s) indicative of the magnetic field, a determined orientation of the magnet 158, and/or other information regarding the magnet 158 that may be used to determine the position/orientation of the magnet 158 and/or the position of the bolt 101. The sensor 156 may be, in some embodiments, a Hall-effect sensor including one or more Hall-effect elements configured to generate a DC output voltage proportional to the strength of an applied magnetic field from the magnet 158. In such an embodiment, the sensor 156 may determine the orientation or rotational position of the magnet 158 by combining the output voltages of the one or more Hall-effect elements.

More particularly, since the magnet 158 can be used as a non-incremental measurement of position, without prior information regarding the position of the of the magnet 158, the position of the bolt 101 can be determined at any time. Should volatile memory of the door lock be erased (e.g., following a power loss or cycling event), the sensor 156 is able to determine an absolute rotational position of the magnet 158. The sensor 156 is connected to the processor 152 and is configured to provide a signal indicative of the at least one gear of the transmission to the processor. The processor 152 is configured to receive the signal from the sensor and determine a position of the driveshaft 107 based on the signal from the sensor. For example, the processor may apply a predetermined transmission ratio scaling factor representative of the gearing between the driveshaft and the at least one gear of the transmission.

Figure 3:
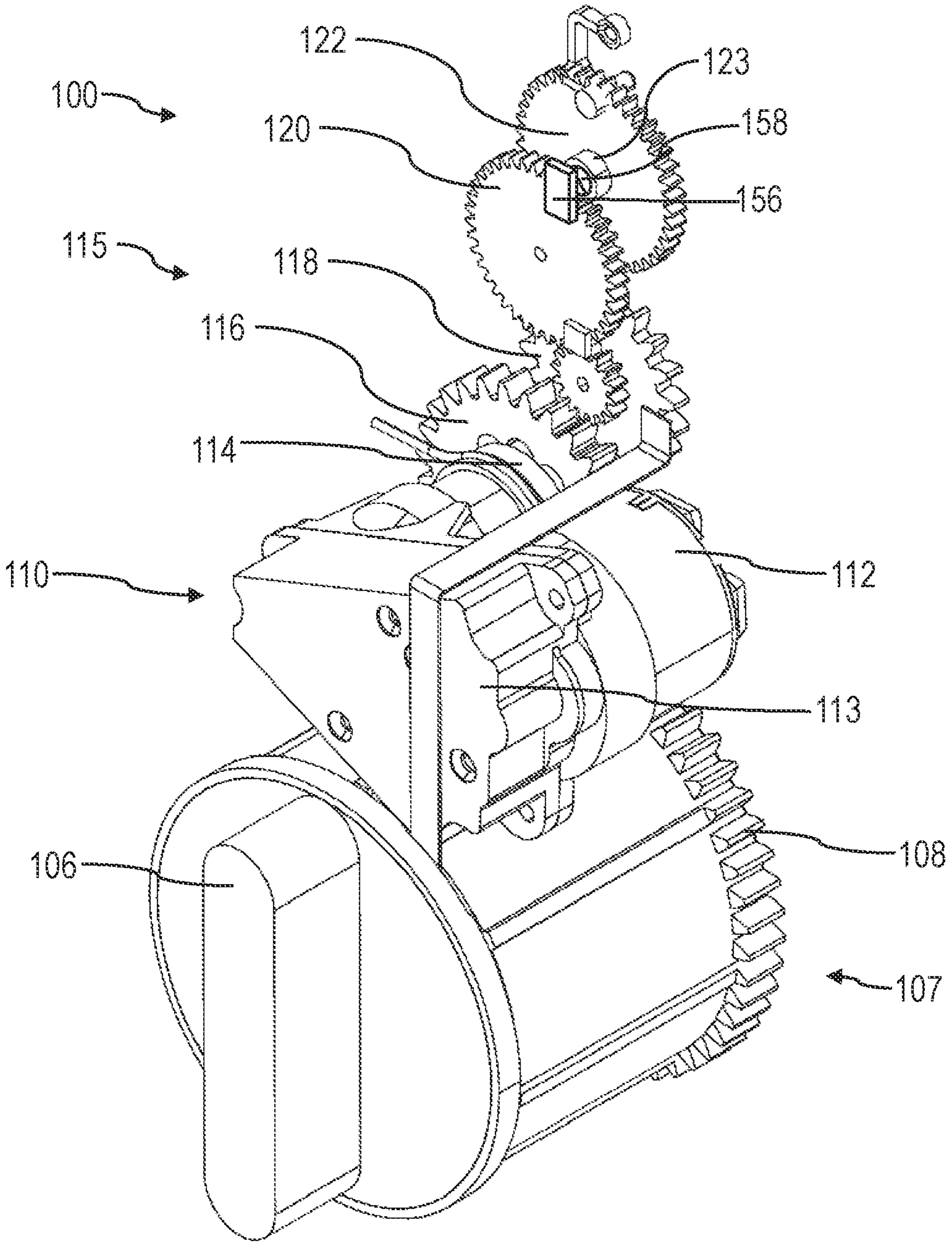
FIG. 3 is a front perspective view of the door lock of FIG. 1 with a housing and a circuit board of the door lock removed.
Figure 4:
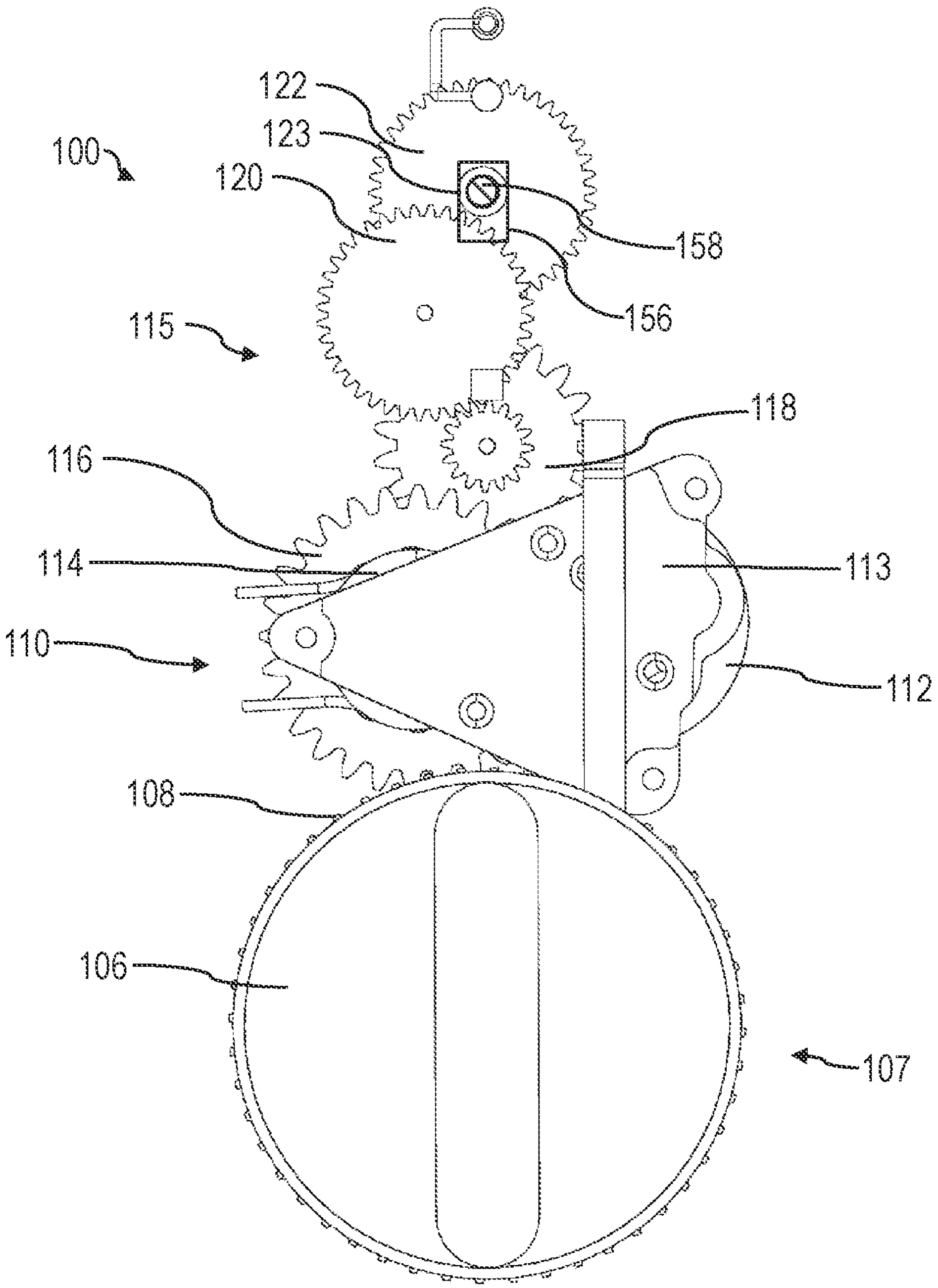
FIG. 4 is a front view of the door lock of FIG. 3.

FIG. 3 is a front perspective view and FIG. 4 is a front view of the door lock 100 of FIG. 1 with the housing and the circuit board 150 of the door lock removed to show the transmission 115 of the door lock. As shown in FIG. 3, the door lock includes a first transmission gear 118, a second transmission gear 120, and a sensor gear 122. The first transmission gear 118 is coupled to the output gear 116 and the second transmission gear 120. The second transmission gear 120 is coupled to the first transmission gear 118 and the sensor gear 122. Accordingly, the sensor gear 122 is coupled to the output gear 116, and correspondingly the drive gear 108. Accordingly, whenever the driveshaft 107 rotates (e.g., to move a bolt between an extended position and a retracted position), the sensor gear 122 correspondingly rotates. In the embodiment of FIG. 3, the transmission 115 gears down the rotations from the driveshaft 107. That is, the driveshaft 107 may be configured to rotate multiple times to move an associated bolt between an extended position and a retracted position. Accordingly, to simplify the tracking of the position of the driveshaft, the transmission reduces the number of rotations of the sensor gear 122 for each rotation of the driveshaft. In the particular embodiment of FIG. 3, the transmission 115 may reduce the number of rotations of the driveshaft to rotations of the sensor gear 122 in a 5:1 ratio. Such an arrangement may mean that for each rotational position of the magnet 158 of the magnetic encoder (i.e., between 0 and 360 degrees), the processor of the door lock may be able to determine both a rotational orientation of the driveshaft 107 and specific rotation the driveshaft is on. For example, a specific rotational position of the sensor gear 122 be indicative of the driveshaft being at a specific rotational position of the third rotation of a total of five rotations between the extended position and retracted position of an associated bolt. Of course, in other embodiments other suitable gear ratios may be employed, as the present disclosure is not so limited. For example, in some embodiments the gear ratio between the driveshaft and the sensor gear may be between 2:1 and 10:1, or alternatively between 4:1 and 6:1. In some embodiments, the gear ratio may be selected based on the number of turns of the rotating driveshaft needed to fully drive the bolt along a travel path from a retracted position to a fully extended position. The gear ratio may be set during design of the transmission, the driveshaft, and the bolt when all components are being designed or manufactured together. For a retrofit design, the gear ratio may be set during design for a known pre-existing lock model having a known number of rotations of a driveshaft to drive the bolt of the pre-existing lock.

While in the embodiment of FIGS. 3-4 the transmission includes four gears (output gear 116, first transmission gear 118, second transmission gear 120, and sensor gear 122), in other embodiments any suitable number of gears may be employed. The specific arrangement of the transmission 115 in FIGS. 3-4 may be suitable to reduce an overall width of the door lock, as the drive gear 108 has the largest diameter, and each of the other gears of the transmission fit within a width defined by the drive gear 108. However, in other embodiments any suitable number of gears may be employed to provide a desired gearing between the drive gear 108 and the sensor gear 122, as the present disclosure is not so limited. For example, in some embodiments, the drive gear 108 may be directly coupled to the sensor gear 122. In such an embodiment, the sensor gear 122 may also function as the output gear 116 for the actuator assembly 110.

As shown most clearly in FIG. 3, the sensor gear 122 includes the magnet 158 of the rotary coder embedded in the gear. In particular, the sensor gear includes a magnet holder 123 which supports the magnet. As discussed previously, the magnet is a diametrically polarized magnet. The magnetic field of the magnet 158 is measured by the sensor 156, which is coaxially aligned with the magnet 158. The sensor 156 and magnet 158 do not physically touch, and instead the sensor determines the rotational position of the magnet 158 by detecting the magnetic field generated by the magnet. In this manner, the magnetic encoder is a non-incremental encoder, as the encoder is able to determine (or a downstream component, e.g., a processor, is able to determine from a signal output by the encoder) the absolute rotational position of the magnet 158 without prior information regarding the rotational position of the magnet. Accordingly, if volatile memory is erased following power loss or power cycling, the encoder is able to determine the rotational position of the magnet 158 and correspondingly the driveshaft 107 in a global reference frame (e.g., a reference frame based from the housing of the door lock). The sensor 156 is sufficiently sensitive such that the small angular position changes of the magnet 158 may be detected that correspond to larger angular position changes of the driveshaft 107 due to the gear of the transmission 115. In some embodiments, the sensor 156 may be configured to detect a change in the magnetic field corresponding to an angular position change of 7 degrees of the driveshaft 107. This may correspond to an angular position change of between 0.5 and 3.5 degrees of the magnet 158. As discussed previously, the sensor 156 may transmit a signal indicative of the absolute rotational position of the magnet 158 to the processor of the door lock, so that the corresponding rotational position of the driveshaft 107 may be determined by the processor.

While in the embodiment of FIGS. 3-4 the sensor 156 is coaxial with the magnet 158, in other embodiments the sensor 156 may not be coaxial with the magnet and instead may be positioned to the side of the magnet 158, such that the sensor and magnet share the same plane. Such an arrangement may reduce the overall stack height of the magnetic encoder combination.

Figure 5:
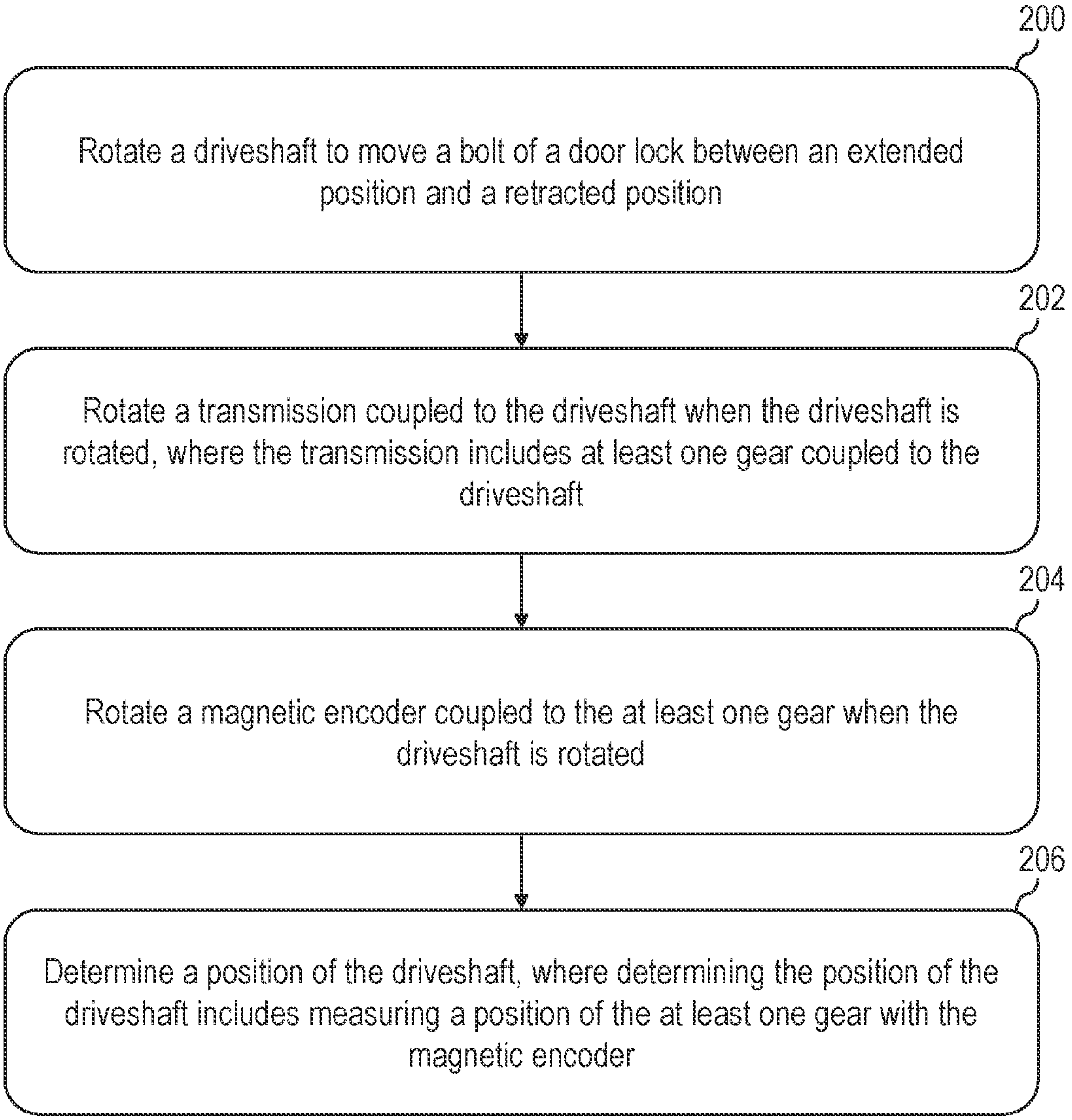
FIG. 5 is a flow chart for one embodiment of method of operating a door lock according to some exemplary embodiments described herein.

FIG. 5 is a flow chart for one embodiment of method of operating a door lock according to exemplary embodiments described herein. Prior to the start of the process, the lock may have just been installed, or just had a power cycle or power reset, such that a position of the bolt has not previously been determined or such that no information about the position of the bolt is available. Or, in some embodiments, the process of FIG. 5 may be used when the door lock has been being used over time to drive the bolt using an actuator and/or manually. Because the process of FIG. 5 uses a non-incrementing approach to determining magnet position, the process may be used in either of these scenarios or other scenarios.

The process of FIG. 5 begins in block 200, in which a driveshaft of a door lock is rotated to move a bolt of the door lock between an extended position and a retracted position. In some embodiments, the bolt may be preexisting, where the driveshaft is coupled to the bolt in retrofit. In some embodiments, rotating the driveshaft may include rotating a handle of the door lock. In some embodiments, rotating the driveshaft may include rotating the driveshaft with an actuator such as a motor.

In block 202, a transmission coupled to the driveshaft is rotated when the driveshaft is rotated, where the transmission includes at least one gear coupled to the driveshaft. In some embodiments, the at least one gear may include four gears. In some embodiments, the transmission may reduce the number of rotations from the driveshaft to a number of rotations of the at least one gear. The transmission may be continually coupled to the driveshaft, such that the at least one gear rotates any time the driveshaft rotates and vice versa.

In block 204, a magnet of a magnetic encoder coupled to the at least one gear is rotated when the driveshaft is rotated. In some embodiments, the magnetic encoder may be at least partially embedded in the at least one gear. In some embodiments, the magnetic encoder includes a diametrically polarized magnet fixed to the at least one gear of the transmission.

In block 206, a position of the driveshaft is determined, where determining the position of the driveshaft includes measuring a position of the at least one gear with the magnetic encoder. The position of the driveshaft may be determined by a processor based on a signal from the magnetic encoder. The signal of the magnetic encoder may be indicative of an absolute rotational position of the at least one gear. Accordingly, in some embodiments the method may also include generating a signal indicative of the position of the at least one gear and transmitting that signal to a processor. In some embodiments, determining the position of the driveshaft may include converting the absolute position of the at least one gear to a position of the driveshaft by applying a scaling factor with the processor. For example, in some embodiments, the processor may scale the position of the at least one gear to the position of the driveshaft by applying a scaling factor based on a gear ratio of the transmission.

As noted previously, the transmission may reduce the number of rotations of the driveshaft to rotations of the at least one gear in an N:1 ratio, where N is greater than 1 and less than 10, greater than or equal to 4 and less than or equal to 6, and/or 5. In some embodiments, rotating the driveshaft to move the bolt between the extended position and the retracted position includes rotating the driveshaft five full rotations. In some embodiments, rotating the magnetic encoder includes rotating the magnetic encoder between zero and one full rotation.

In some embodiments, instead of determining a position of the driveshaft in block 206, a position of the bolt between an extended position and a retracted position may be determined. For example, a processor may determine a linear position of the bolt based on a signal from the magnetic encoder that is indicative of an absolute rotational position of the at least one gear. In some embodiments, the position of the bolt is inferred from the determined position of the driveshaft. For example, the progress of the driveshaft between a locked position and an unlocked position may correspond to progress of the bolt between the extended position and the retracted position during normal operation. In such an embodiment, the process of FIG. 5 may include an additional block following block 206 (or an alternative, in place of block 206 to make an alternative determination) where the position of the bolt is inferred from the determined rotational position of the driveshaft and/or from the signal from the magnetic encoder.

Once the position of the driveshaft is determined in block 206, the process of FIG. 5 may end. The position of the driveshaft may be used for a variety of purposes, as embodiments are not limited in this respect. For example, in some embodiments the position of the driveshaft may be used to determine whether a door is secured or not, which may depend on whether a bolt associated with the driveshaft is in the extended position or is in another position. As another example, the position of the driveshaft may be used to regulate how the actuator drives the driveshaft. For example, as the driveshaft nears an end position (e.g., where an associated bolt is in the extended position or the retracted position), the actuator may adjust how the driveshaft is driven such that the applied force is reduced.

Figure 6:
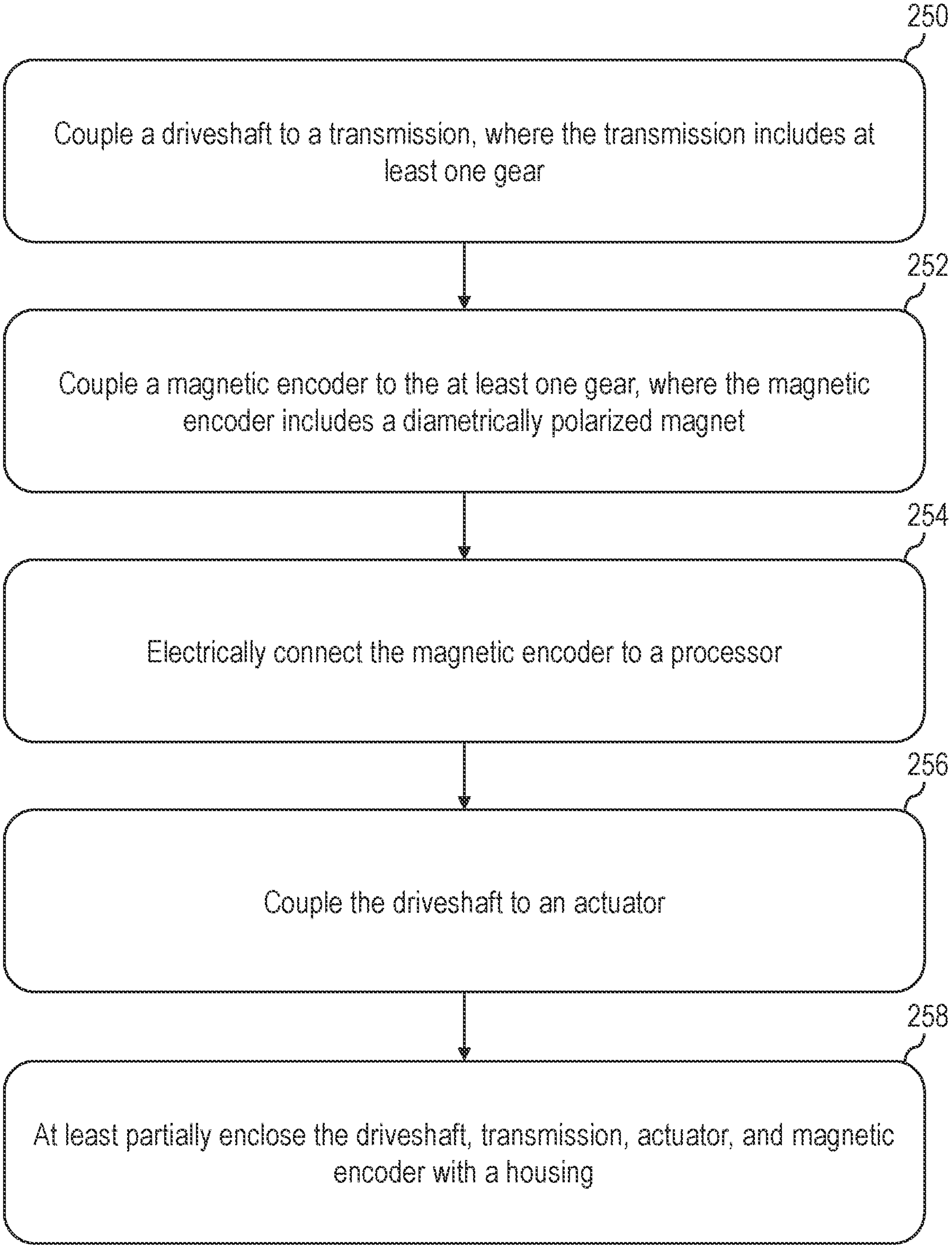
FIG. 6 is a flow chart for one embodiment of a method of manufacturing a door lock according to some exemplary embodiments described herein.

FIG. 6 is a flow chart for one embodiment of a method of manufacturing a door lock according to exemplary embodiments described herein (for example, see FIGS. 1-4). Prior to the start of the process shown in FIG. 6, various components of a door lock may be machined or otherwise provided to an assembler.

The process of FIG. 6 begins in block 250, a driveshaft of a door lock is coupled to a transmission, where the transmission includes at least one gear. In some embodiments, coupling the driveshaft to the transmission includes meshing a drive gear of the driveshaft with the at least one gear of the transmission. In some embodiments, the drive gear and the at least one gear of the transmission may be rotatably coupled to a housing of the door lock.

In block 252, a magnetic encoder is coupled to the at least one gear, where the magnetic encoder includes a diametrically polarized magnet. In some embodiments, coupling the magnetic encoder may include embedding the diametrically polarized magnet into the at least one gear. Embedding the magnet into the at least one gear may form a press fit between the magnet and the at least one gear. In some embodiments, the magnet may be coupled to the at least one gear with a fastener or adhesive. For example, in some embodiments the magnet may be glued to the at least one gear.

In block 254, the magnetic encoder is electrically connected to the processor. In some embodiments, the magnetic encoder and processor may be connected to once another via a circuit board. For example, one or more traces on the circuit board may electrically connect the magnetic encoder and processor. The magnetic encoder may be configured to send one or more signals to the processor through the electrical connection between the processor and magnetic encoder.

In block 256 the driveshaft is coupled to an actuator. In some embodiments, the actuator may be a motor. In some embodiments, coupling the driveshaft to the actuator may include coupling an output shaft of the actuator to the transmission.

In block 258, the driveshaft, transmission, actuator, and magnetic encoder may be at least partially enclosed in a housing. In some embodiments, at least partially enclosing the driveshaft, transmission, actuator, and magnetic encoder may include mounting the driveshaft, transmission, actuator and magnetic encoder in the housing. In some embodiments, the components of the door lock may be mounted in the housing with one or more fasteners (e.g., screws) or adhesives. In some embodiments, the driveshaft and transmission may be rotatably mounted in the housing, such that the driveshaft and transmission may rotate relative to the housing.

Once the driveshaft, transmission, actuator, and magnetic encoder at least partially enclosed in the housing in block 258, the process of FIG. 6 ends. The door lock may be employed in a new or pre-existing door including new or pre-existing hardware, as embodiments are not limited in this respect. For example, in some embodiments the door lock may be mounted to a pre-existing door and the driveshaft coupled to a pre-existing bolt disposed in the door.

Figure 7:
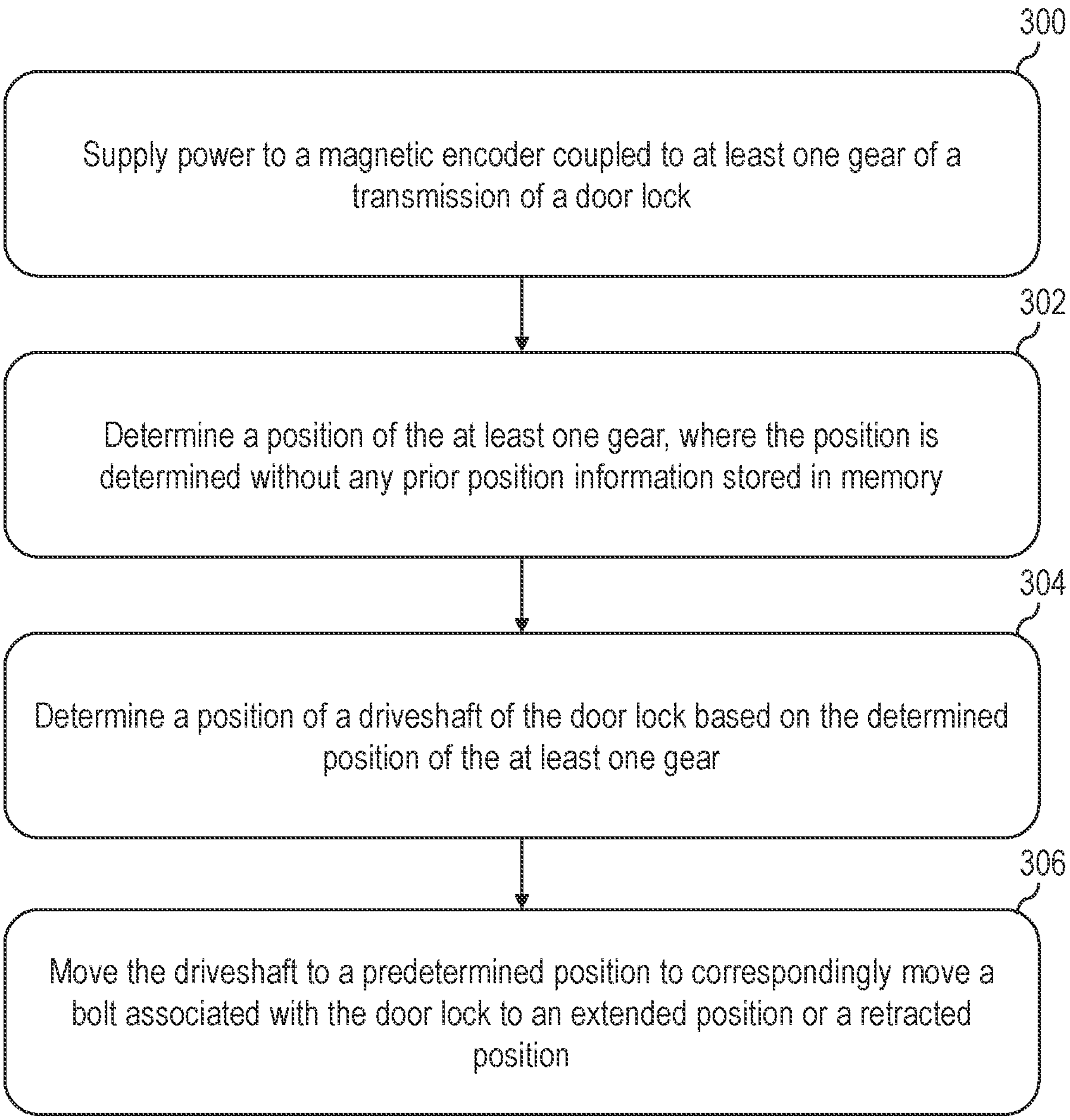
FIG. 7 is a flow chart for another embodiment of a method of operating a door lock according to some exemplary embodiments described herein.

FIG. 7 is a flow chart for another embodiment of a method of operating a door lock according to exemplary embodiments described herein. In particular, the embodiment of FIG. 7 includes a method for startup of the door lock or recovery of a power cycling event. Prior to the start of the process shown in FIG. 7, the door lock may lack power for one or more components of the door lock. For example, in some embodiments a processor and/or a magnetic encoder may lack power. In some embodiments, the door lock may not include a power source (e.g., a battery is disconnected) or the power source may lack power (e.g., a battery is fully drained).

In block 300, power is supplied to a magnetic encoder coupled to at least one gear of a transmission of the door lock. In some embodiments, the power may be supplied from a battery pack. In other embodiments, the power may be supplied from a hardwired source. The power may be selectively supplied to the magnetic encoder. For example, power may be not supplied during the replacement of a battery pack, or during another interruption of electrical supply.

In block 302, a position of the at least one gear is determined, where the position is determined without any prior position information stored in memory. For example, in some embodiments the magnetic encoder may provide a non-incremental signal indicative of an absolute position of the at least one gear. The position of the at least one gear may be determined even following an erasure of volatile memory associated with a loss of power.

In block 304, a position of the driveshaft of the door lock is determined based on the determined position of the at least one gear. For example, a processor may receive a signal from the magnetic encoder and use that signal to determine a position of the driveshaft. In some embodiments, the signal may be indicative of a rotational position of the at least one gear based on the rotational orientation of a magnet coupled to the at least one gear. In some embodiments, the processor may apply a scaling factor matching the gear ratio between the driveshaft and the at least one gear.

In block 306, the driveshaft is moved to a predetermined position to correspondingly move a bolt associated with door lock to an extended position or a retracted position. In some embodiments, block 306 may be performed automatically following a determination of the position of the driveshaft. For example, in some embodiments a door lock may move the bolt automatically to a locked state, corresponding to moving the bolt to an extended position. Accordingly, the door lock may move the driveshaft to move the bolt to the extended position if it is determined that the driveshaft is in a position other than a position associated with the extended position. Similarly, in some embodiments the door lock may move the driveshaft to move the bolt to the retracted position. According to these embodiments, if there is a power cycling event during movement of the driveshaft, the position of the driveshaft may be determined and the action that was being previously performed by the door lock may be continued and/or completed.

Once the driveshaft is moved in block 306, the process of FIG. 7 ends. As noted previously, the process of FIG. 7 may be used for a variety of purposes, as embodiments are not limited in this respect. For example, in some embodiments the process of FIG. 7 may be used to initialize a door lock for a new installation. In other embodiments, the process of FIG. 7 may be used to restore a door lock following a power loss.

Figure 8:
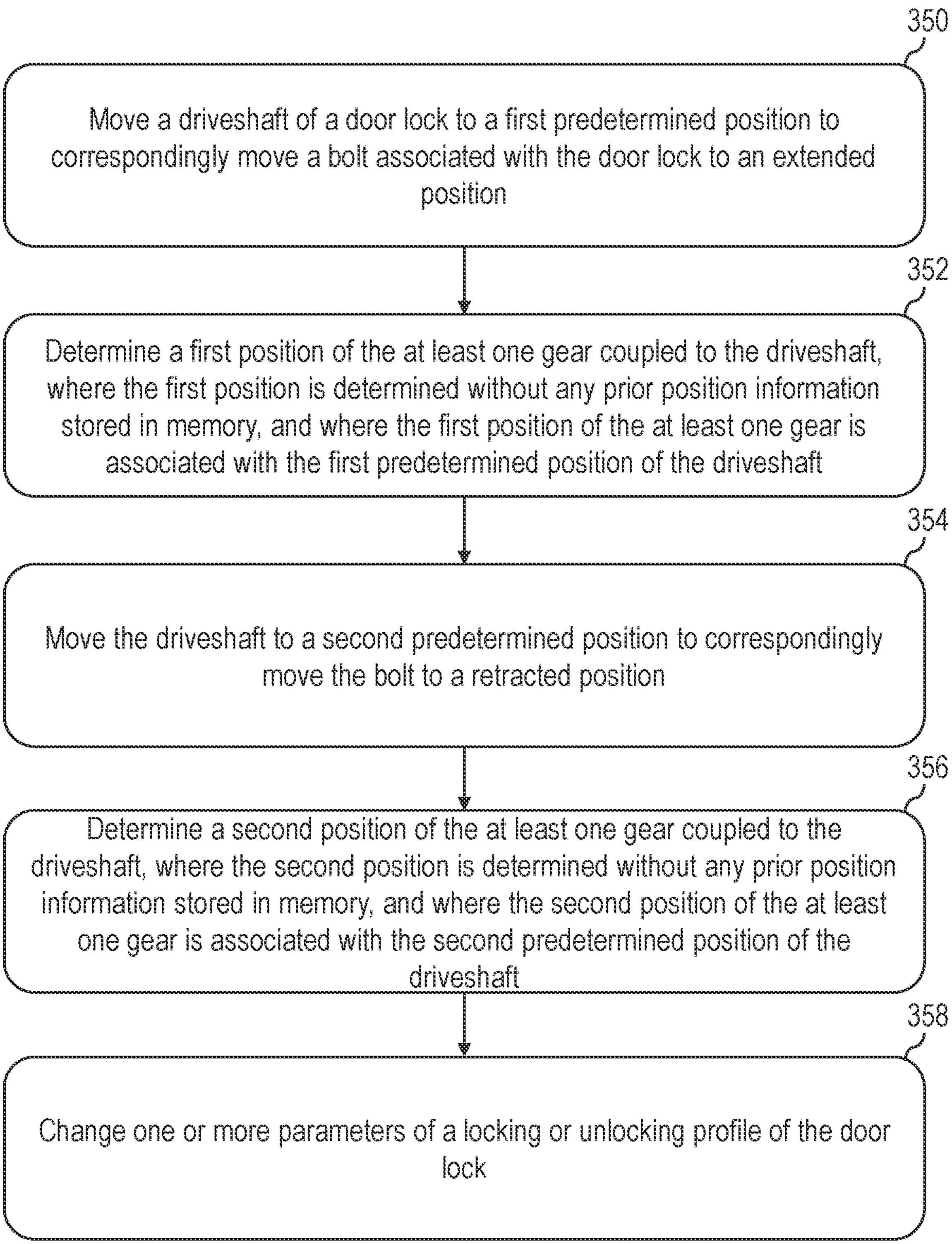
FIG. 8 is a flow chart for yet another embodiment of a method of operating a door lock according to some exemplary embodiments described herein.

FIG. 8 is a flow chart for yet another embodiment of a method of operating a door lock according to exemplary embodiments described herein. According to the embodiment of FIG. 8, the method may be a method of calibrating or otherwise altering the operation of the door lock. Prior to the start of the process shown in FIG. 8, the door lock may be installed in a door. In some embodiments, the door lock may be installed and coupled to pre-existing lock hardware disposed in the door such as a bolt.

In block 350, a driveshaft of the door lock is moved to a first predetermined position to correspondingly move a bolt associated with the door lock to an extended position. For example, the driveshaft is rotated one or more times to correspondingly move the bolt to the extended position. In some embodiments, the driveshaft is rotated five times to correspondingly move to the bolt to the extended position.

In block 352, a first position of the at least one gear coupled to the driveshaft is determined. The first position of the at least one gear may be determined without any prior position information stored in memory. For example, in some embodiments a processor may determine the first position based on one or more non-incremental signals from a magnetic encoder. The first position of the at least one gear is also associated with the first predetermined position of the driveshaft. For example, the at least one gear may be coupled to the driveshaft with a gear ratio so that a rotational position of the at least one gear corresponds to a rotational position of the driveshaft.

In block 354, the driveshaft is moved to a second predetermined position to correspondingly move the bolt to a retracted position. For example, the driveshaft is rotated one or more times to correspondingly move the bolt to the retracted position. In some embodiments the driveshaft is rotated five times to correspondingly move the bolt to the retracted position.

In block 356, a second position of the at least one gear coupled to the driveshaft is determined, where the second position is determined without any prior position information stored in memory. For example, in some embodiments a processor may determine the second position based on one or more non-incremental signals from a magnetic encoder. The second position of the at least one gear is associated with the second predetermined position of the driveshaft. For example, the at least one gear may be coupled to the driveshaft with a gear ratio so that a rotational position of the at least one gear corresponds to a rotational position of the driveshaft.

In block 358, one or more parameters of a locking or unlocking profile of the door lock are changed. The one or more parameters may be various operating factors of an actuator of the door lock. For example, in some embodiments a door lock may reduce the actuator speed as the bolt approaches the extended position or the retracted position. As another example, in some embodiments the current supplied to an actuator of the door lock may be reduces as the bolt approaches the extended position or the retracted position. Of course, any suitable parameter of a door lock unlocking or locking profile may be changed based on the determined positions of the driveshaft, as the present disclosure is not so limited. Once the one or more parameters of a locking or unlocking profile of the door lock are changed, the process of FIG. 8 ends.

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Such processors may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the embodiments described herein may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present disclosure as discussed above. As used herein, the term "computer-readable storage medium" encompasses only a non-transitory computer-readable medium that can be considered to be a manufacture (i.e., article of manufacture) or a machine. Alternatively or additionally, the disclosure may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present disclosure as discussed above. Additionally, it should be appreciated that according to one aspect of this embodiment, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present disclosure may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the embodiments described herein may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. A door lock comprising:

a driveshaft operatively couplable to a door lock bolt, the driveshaft being rotatable over a driveshaft range greater than 360 degrees between a first end position to a second end position to move the door lock bolt between an extended position and a retracted position;

a transmission coupled to the driveshaft; and a sensor gear operatively connected with the driveshaft by the transmission, wherein the transmission reduces rotation of the sensor gear to a sensor gear range of no greater than 360 degrees when the driveshaft is rotated over the driveshaft range; and a sensor configured to detect a rotational position of the sensor gear corresponding to rotation of the sensor gear to a position along the sensor gear range.

2. The door lock of claim 1, wherein the sensor gear includes a magnet and the sensor comprises a Hall-effect sensor.

3. The door lock of claim 1, further comprising one or more processors electrically connected with the sensor and configured to receive from the sensor a signal corresponding to the rotational position of the sensor gear, the one or more processors being further configured to determine a corresponding position of the driveshaft between the first end position and the second end position.

4. The door lock of claim 3, wherein the one or more processors are further configured to determine a position of the door lock bolt between the extended position and the retracted position based on the corresponding position of the driveshaft between the first end position and the second end position.

5. The door lock of claim 3, further comprising a transceiver in communication with the one or more processors for transmission of door lock information from the one or more processors to one or more remote devices.

6. The door lock of claim 1, further comprising an actuator coupled to the driveshaft for selective rotation of the driveshaft.

7. The door lock of claim 6, wherein the actuator is couple to the driveshaft through the transmission.

8. The door lock of claim 6, wherein the actuator comprises a motor.

9. The door lock of claim 6, further comprising a clutch selectively coupling the actuator to the transmission.

10. The door lock of claim 1, further comprising a handle coupled to the driveshaft for manual rotation of the driveshaft.

11. The door lock of claim 10, wherein the handle is directly coupled to and rotatable with the driveshaft.

12. The door lock of claim 1, wherein the transmission includes a drive gear directly coupled to and rotatable with the driveshaft.

13. The door lock of claim 12, wherein the transmission includes at least one transmission gear disposed between the drive gear and the sensor gear, the at least one transmission gear being configured to reduce rotation of the sensor gear with respect to rotation of the drive gear.

14. A method of determining a position of a door lock bolt between an extended locked position and a retracted unlocked position, the method comprising:

operating a transmission coupled to a driveshaft to rotate the driveshaft over a driveshaft range greater than 360 degrees for movement of the door lock bolt between the extended locked position and the retracted unlocked position, such that a sensor gear coupled to the transmission is rotated over a sensor gear range no greater than 360 degrees;

determining a position of the sensor gear along the sensor gear range using a sensor;

transmitting a signal indicative of the position of the sensor gear to one or more processors;

using the one or more processors, determining a position of the driveshaft along the driveshaft range corresponding to the position of the sensor gear along the sensor gear range; and using the one or more processors, determining the position of the door lock bolt corresponding to the position of the driveshaft.

15. The method of claim 14, wherein the signal is a non-incremental signal.

16. The method of claim 14, wherein the position of the driveshaft is determined without reference to a prior position of the driveshaft with the processor.

17. The method of claim 14, wherein the door lock includes a motor, and wherein operating the transmission comprises supplying current to the motor.

18. The method of claim 14, wherein the door lock includes a handle, and wherein operating the transmission comprises manually rotating the handle.

19. The method of claim 18, wherein the handle is directly coupled to and rotatable with the driveshaft.

20. The method of claim 14, further comprising transmitting door lock information from the one or more processors to one or more remote devices.

* * * * *